Oct. 11, 1949.    E. F. FISHER    2,484,277
DUST COLLECTOR AND SLUDGE SEPARATOR
Filed Oct. 25, 1944
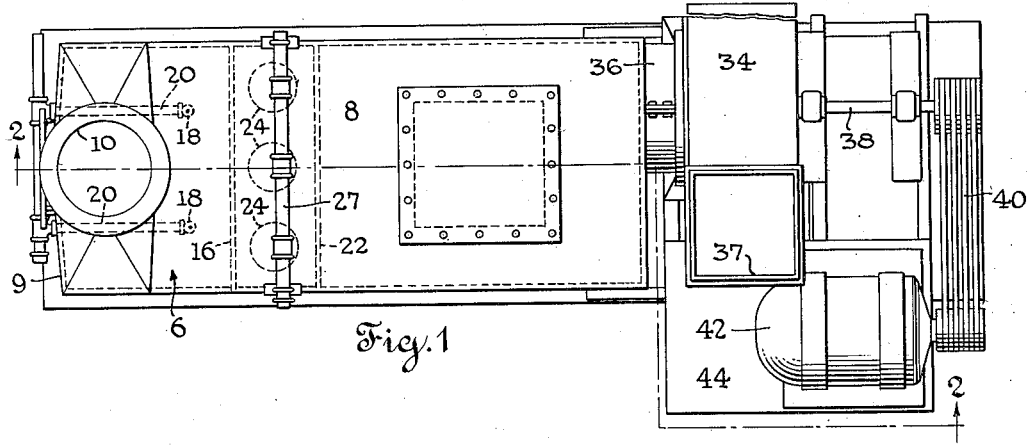
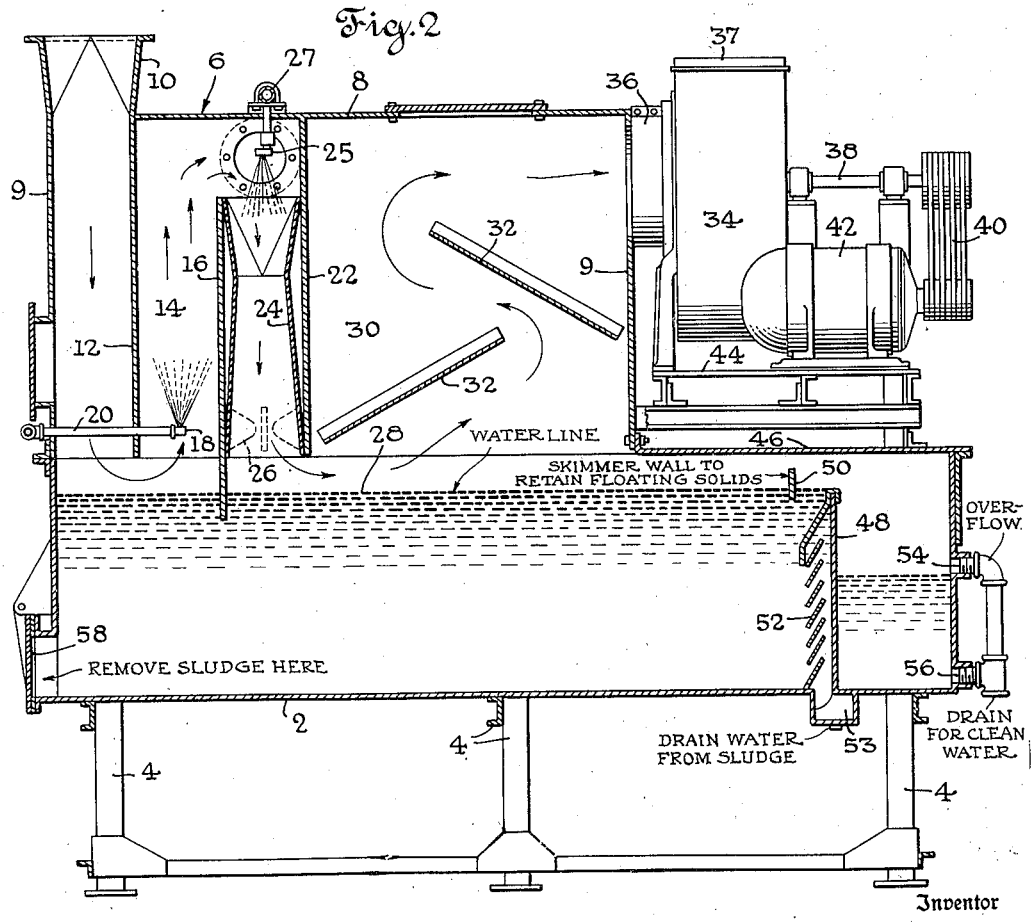

Patented Oct. 11, 1949

2,484,277

UNITED STATES PATENT OFFICE 2,484,277

DUST COLLECTOR AND SLUDGE SEPARATOR

Ernest F. Fisher, Harvey, Ill., assignor to Whiting Corporation, Harvey, Ill., a corporation of Illinois Application October 25, 1944, Serial No. 560,249

3 Claims. (Cl. 183—24)

This invention is a combined dust collector and sludge separator combined into a compact unitary structure which cleans dust-laden air with the assistance of a water spray, the resulting sludge being delivered to a sludge tank in which the sludge is separated from the water and the sludge-free water drained off to a sewer or the like. The same water used in the dust collector maintains the proper water level in the sludge tank just below it, and provides a suspension medium through which the sludge settles in a layer on the bottom of the sludge tank.

The present invention is an improvement upon the subject matter of my United States Patent No. 2,248,665, dated July 8, 1941, and entitled "Sludge separator" and also upon the subject matter of my United States Patent No. 2,293,250, dated August 18, 1942, and entitled "Dust collector."

The dust collector comprises a plurality of vertical tubes for the circulation therethrough of dust-laden air, these tubes being provided with water sprays for wetting the dust and causing it to drop from the lower ends of the tubes into the sludge tank therebelow as sludge. These sprays are also preferably arranged to have a propelling effect on the air for aiding its circulation through the tubes.

After the dust has been removed from the air as sludge, the cleaned air passes through a chamber containing spray eliminator plates and thence to the intake of an exhaust fan, which serves to pull the air through the dust collector.

The sludge drops into the sludge tank, which is directly below the dust collector and which is maintained nearly full of water. The relatively heavy sludge settles out by gravity and is removed from the tank from time to time. The sludge tank is provided with an overflow weir and louvre drain plates for allowing the escape of sludge-free water, but acting to hold back the sludge.

When a substantial amount of sludge has accumulated in the sludge tank, a suitable drain is opened for draining off as much water as possible and the sludge is removed from the tank through a suitable door that is provided for the purpose.

Further advantages of construction and operation of the invention will be described in connection with the accompanying drawing which illustrates the preferred form of the invention.

In the drawing

Fig. 1 is a plan view of the combined dust collector and sludge separator; and

Fig. 2 is a view partly in side elevation and partly in section, and taken on the line 2—2 of Fig. 1.

In the drawing, the sludge tank 2, supported by suitable legs 4, has mounted thereon a dust collector indicated generally at 6. The dust collector comprises a horizontally elongated box-like housing formed by a top wall 8, end walls 9, and side walls between the end walls. Dust-laden air enters the housing through a vertical inlet tube 10, passing downwardly therein and around the lower edge of wall 12 of the inlet tube 10 and upwardly into a passageway 14 defined by wall 12, a transversely extending vertical wall 16 and the top 8 of the housing. The lower edge of wall 16 extends below the water level in the sludge tank. As the air passes upwardly in passageway 14, it is contacted with an upwardly directed water spray from nozzles 18 supplied by pipe 20.

The upper edge of wall 16 is spaced below the wall 8 of the housing and positioned between wall 16 and another transversely extending vertical wall 22 which extends up to the top wall 8, are three vertical Venturi tubes 24. Just above the upper end of each of the Venturi tubes is a water spray nozzle 25 supplied by water from a manifold 27. The water sprays are downwardly directed into the Venturi tubes and serve to wet the dust therein and also to propel it down the Venturi tubes past disintegrator fins 26, into the water in the sludge tank, the surface of which is indicated by the reference numeral 28. Disintegrator cones may be used in place of fins 26, if desired and as shown in my aforesaid Patent No. 2,293,250.

By the time the air passes through the Venturi tubes 24 it is thoroughly cleaned of dust. The cleaned air then passes under and around the lower edge of wall 22 in chamber 30, zig-zagging past diagonally arranged spray eliminator plates 32.

In order to aid the circulation of the air through the dust collector just described, a suction fan 34 has its intake connected by a duct 36 to the chamber 30, the clean air outlet from the fan being shown at 37. Only clean air is thus supplied to the fan.

The fan 34 is driven by shaft 38, belt 40 and motor 42, the fan and motor being conveniently mounted on a platform 44 supported above a plate 46 mounted on top of the sludge tank 2.

The water in the sludge tank 2 is maintained at the level indicated by an overflow weir 48. A skimmer plate 50 directly in front of the weir projects below the water level and extends between the side walls of the tank.

The outlet end of the sludge tank is provided adjacent the weir 48 with a vertical series of angularly arranged overlapping louvre plates 52 and these are adapted to allow water to seep therebetween in the direction of the weir while at the same time they serve to hold back the settled sludge in the tank. The water that seeps between the louvre plates drains into a sump or dewatering drain 53 having a removable plug at the bottom thereof. In connection with a sludge removal operation the plug is removed with the result that the water in the tank drains away through the sump or drain 53. After drainage of the water the sludge is removed from the tank via the clean-out door 58 at the front end of the tank.

The outlet end of the tank is also provided with overflow pipes 54 and 56 for carrying off sludge-free water to a sewer (not shown).

The operation is as follows:

Dust-laden air enters the inlet tube 10, the heavier dust being projected into the water in the sludge tank and settling as sludge. The air and finer dust then pass upwardly in passageway 14 where the dust is wet by spray from the nozzles 18, the movement of air and dust being aided by the effect of the sprays. The air and dust then pass around below the nozzles 25 where they are sprayed with water from these nozzles and projected thereby into the Venturi tubes 24, where their velocity is increased by reason of the venturis, and where they are thoroughly mixed with the spray from nozzles 25. The dust and air then pass the vanes 26, the wetted dust falling as sludge into the sludge tank, while the cleaned air passes into the chamber 30 where surplus spray is removed by the spray eliminator plates 32. The air, by this time free of dust and spray, then passes into the inlet of fan 34 and out of the clean air outlet 37. The described circulation of air through the air cleaner is effected by the suction fan, by the water sprays, and by the Venturi tubes.

The same water that propels the air and wets the air in the air cleaner maintains a pool of water up to the water line 28 in the sludge tank. The sludge, being heavy, settles to the bottom of the tank, while sludge-free water flows over the upper edge of weir 48 and out through the pipes 54 and 56.

After a substantial amount of sludge has settled out in the tank 2, the sludge drain 53 is opened and excess water drained off, the sludge being held back by the louvre plates 52. Then the sludge is cleaned out of the tank through the clean-out door 58.

There has thus been provided a compact, efficient unit which takes dust-laden air, and cleans it thoroughly from the dust. The same water that is used to clean and propel the air carries the sludge into the sludge tank and maintains the water level therein. The one apparatus, therefore, delivers cleaned air to the atmosphere, delivers sludge-free water to the sewer, and separates out the sludge so that it can readily be removed from the sludge tank.

While the preferred embodiment of the invention has been described in detail, it should be understood that the invention is not to be limited to the details set forth, but may be carried out in other ways.

I claim as my invention:

1. A combined dust collector and sludge separator comprising a horizontally elongated sludge tank having a weir at one end thereof for normally maintaining a body of water in the tank at a predetermined constant level, a horizontally elongated dust collector for cleaning dust laden air, positioned above and in parallel relation with the tank, having an open bottom over and in direct communication with said tank, consisting of a top wall, a pair of end walls and a pair of side walls, having in the top wall and adjacent one end wall thereof a downwardly facing air inlet and in the other end wall thereof a laterally extending air outlet, and embodying a first crosswall depending from the top wall, extending between the side walls, having the lower margin thereof terminating above the water level, positioned in opposed relation with said one end wall, and defining with said one end wall a downwardly extending first passageway with its upper end communicating with the air inlet, a second crosswall extending between the side walls, having the upper margin thereof disposed beneath the top wall and its lower margin extending into the body of water in the sludge tank, spaced inwards from the first crosswall and defining therewith an upwardly extending second passageway with the lower end thereof in communication with the lower end of the first passageway, and a third crosswall depending from the top wall, extending between the side walls, having the lower margin thereof disposed above said water level, spaced inwards from the second crosswall, defining with said second crosswall a downwardly extending third passageway with the upper end thereof in communication with the second passageway, and defining with said other end wall an enlarged chamber with the lower portion thereof in communication with the lower end of the third passageway, a plurality of vertically extending, side by side Venturi tubes disposed in the third passageway, downwardly facing nozzles disposed in the upper end of the third passageway, positioned in alignment with the Venturi tubes and adapted to spray water downwards through said tubes and into the sludge tank, angularly disposed spray eliminator plates in said chamber, and a power driven suction fan connected to the aforesaid air outlet and operative when driven to cause the air being cleaned to flow successively downwards through the first passageway, upwards through the second passageway, downwards through the Venturi tubes, and thence through the chamber.

2. A combined dust collector and sludge separator comprising a horizontally elongated sludge tank having a weir at one end thereof for normally maintaining a body of water in the tank at a predetermined constant level, a horizontally elongated dust collector for cleaning dust laden air, positioned above and in parallel relation with the tank, having an open bottom over and in direct communication with said tank, consisting of a top wall, a pair of end walls and a pair of side walls, having in the top wall and adjacent one end wall thereof a downwardly facing air inlet and in the other end wall thereof a laterally extending air outlet, and embodying a first crosswall depending from the top wall, extending between the side walls, having the lower margin thereof terminating above the water level, positioned in opposed relation with said one end wall, and defining with said one end wall a downwardly extending first passageway with its upper end communicating with the air inlet, a second crosswall extending between the side walls, having the upper margin thereof disposed beneath the top wall and its lower margin extending into the body of water in the sludge tank, spaced inwards from the first crosswall and defining therewith an upwardly extending second passageway with the lower end thereof in communication with the lower end of the first passageway, and a third crosswall depending from the top wall, extending between the side walls, having the lower margin thereof disposed above said water level, spaced inwards from the second crosswall, defining with said second crosswall a downwardly extending third passageway with the upper end thereof in communication with the second passageway, and defining with said other end wall an enlarged chamber with the lower portion thereof in communication with the lower end of the third passageway, a plurality of vertically extending side by side Venturi tubes disposed in the third passageway, upwardly facing nozzles disposed in the lower end of the second passageway and adapted to spray water upwards in said second passageway, downwardly facing nozzles disposed in the upper end of the third passageway, positioned in alignment with the Venturi tubes and adapted to spray water downwards through said tubes and into the sludge tank, angularly disposed spray eliminator plates in said chamber, and a power driven suction fan connected to the aforesaid air outlet and operative when driven to cause the air being cleaned to flow successively downwards through the first passageway, upwards through the second passageway, downwards through the Venturi tubes, and thence through the chamber.

3. A combined dust collector and sludge separator comprising an elongated sludge tank having a weir at one end thereof for normally maintaining a body of water in the tank at a predetermined constant level, a horizontally elongated dust collector for cleaning dust laden air, positioned above and in parallel relation with the tank, having an open bottom over and in direct communication with said tank, consisting of a top wall, a pair of end walls and a pair of side walls between the end walls, having in the top wall and adjacent the one end wall thereof that is adjacent the other end of the tank, a downwardly facing air inlet, and in its other end wall a laterally extending air outlet, and embodying a first crosswall depending from the top wall, extending between the side walls, having the lower margin thereof terminating above the water level, positioned in opposed relation with said one end wall, and defining with said one end wall a downwardly extending first passageway with its upper end communicating with the air inlet, a second crosswall extending between the side walls, having the upper margin thereof disposed beneath the top wall and its lower margin extending into the body of water in the sludge tank, spaced inwards from the first crosswall and defining therewith an upwardly extending second passageway with the lower end thereof in communication with the lower end of the first passageway, and a third crosswall depending from the top wall, extending between the side walls, having the lower margin thereof disposed above said water level, spaced inwards from the second crosswall, defining with said second crosswall a downwardly extending third passageway with the upper end thereof in communication with the second passageway, and defining with said other end wall an enlarged chamber with the lower portion thereof in communication with the lower end of the third passageway, a plurality of vertically extending, side by side Venturi tubes disposed in the third passageway, downwardly facing nozzles disposed in the upper end of the third passageway, positioned in alignment with the Venturi tubes and adapted to spray water downwards through said tubes and into the sludge tank, angularly disposed spray eliminator plates in said chamber, a power driven suction fan connected to the aforesaid air outlet and operative when driven to cause the air being cleaned to flow successively downwards through the first passageway, upwards through the second passageway, downwards through the Venturi tubes and thence through the chamber, means adjacent the weir for draining the tank of sludge free water when the combined dust collector and sludge separator is not in use, and means at said other end of the tank for removing the sludge after drainage of the water from the tank by way of the draining means.

ERNEST F. FISHER.

REFERENCES CITED

The following references are of record in the file of this patent:

UNITED STATES PATENTS

| Number | Name | Date |
|---|---|---|
| 604,844 | Roberts | May 31, 1898 |
| 1,434,301 | Liljegran | Oct. 31, 1922 |
| 1,501,416 | Lane | July 15, 1924 |
| 1,743,554 | Larkin | Jan. 14, 1930 |
| 1,793,620 | Jacobus | Feb. 14, 1931 |
| 2,171,574 | Lambert et al. | Sept. 5, 1939 |
| 2,337,983 | Fisher | Dec. 28, 1943 |